United States Patent [19]

Shorey

[11] 4,375,877
[45] Mar. 8, 1983

[54] ESCAPE SLIDE STOWAGE AND DEPLOYMENT SYSTEM

[75] Inventor: Thomas H. Shorey, Freeland, Wash.

[73] Assignee: The Boeing Company, Seattle, Wash.

[21] Appl. No.: 221,899

[22] Filed: Dec. 31, 1980

[51] Int. Cl.³ .............................................. B64D 25/14
[52] U.S. Cl. ........................ 244/137 P; 244/DIG. 2; 193/25 B; 182/48
[58] Field of Search .......... 244/137 P, DIG. 2, 118.3, 244/129.5, 129.6; 182/48, 49, 70, 76; 193/25 B, 25 C; 9/14; 441/41, 42, 83

[56] References Cited

U.S. PATENT DOCUMENTS

| | | | |
|---|---|---|---|
| 2,765,131 | 10/1956 | Boyle | 244/137 P |
| 3,102,623 | 9/1963 | Schacht et al. | 193/25 |
| 3,463,287 | 8/1969 | Smith | 193/25 |
| 3,465,991 | 9/1969 | Banas et al. | 244/137 |
| 3,633,853 | 1/1972 | Collins | 244/137 P |
| 3,771,749 | 11/1973 | Smialowicz | 244/137 P |
| 3,840,057 | 10/1974 | Lesh | 244/137 P |
| 3,852,854 | 12/1974 | Sigrud et al. | 24/230 AT |
| 3,910,532 | 10/1975 | Fischer | 244/137 P |
| 4,013,247 | 3/1977 | Giffin | 244/137 P |
| 4,014,486 | 3/1977 | Nelson et al. | 244/129.6 |
| 4,018,321 | 4/1977 | Fisher | 193/25 B |
| 4,106,729 | 8/1978 | Bergman et al. | 244/137 P |
| 4,125,235 | 11/1978 | Fitzgerald et al. | 244/129.5 |

FOREIGN PATENT DOCUMENTS

| | | | |
|---|---|---|---|
| 1463822 | 2/1977 | United Kingdom | 244/DIG. 2 |
| 1538084 | 1/1979 | United Kingdom | 244/DIG. 2 |

Primary Examiner—Charles E. Frankfort

Attorney, Agent, or Firm—Christensen, O'Connor, Johnson & Kindness

[57] ABSTRACT

A self-contained emergency evacuation system of the type including an inflatable escape slide is disclosed wherein a packboard and three hinged together deployment links form the system stowage pack which is secured to the floor of an aircraft adjacent to an upwardly and outwardly swinging emergency door. As the door opens, a deployment lanyard that is connected between a door-mounted arming and deployment mechanism and the upper portion of the stowage pack tips the stowage pack out of the aircraft door, with the deployment lanyard being automatically released as the stowage pack begins to fall under the force of gravity. Since the first of the three hinged together deployment links is hinged to the system base plate and swings into contact with the door sill region, the two other deployment links and packboard swing arcuately out of the aircraft. When the packboard begins to swing apart from the third deployment link, which is hinged to the upper edge of the packboard, an inflation lanyard is placed under tension. This operates valves that permit compressed air to flow from two compressed gas cylinders to turbine-type air fans that are mounted to the packboard bottom panel. Ambient air, entrained by the turbine-type air fans, rapidly inflates the escape slide as the packboard and lower deployment link swing into contact with the aircraft. A girt, which is formed in the upper end of the escape slide and encompasses a girt bar that is mounted to and contained in the first deployment link, comes under tension as inflation occurs to thereby stabilize the escape slide during the final phase of deployment and use.

16 Claims, 23 Drawing Figures

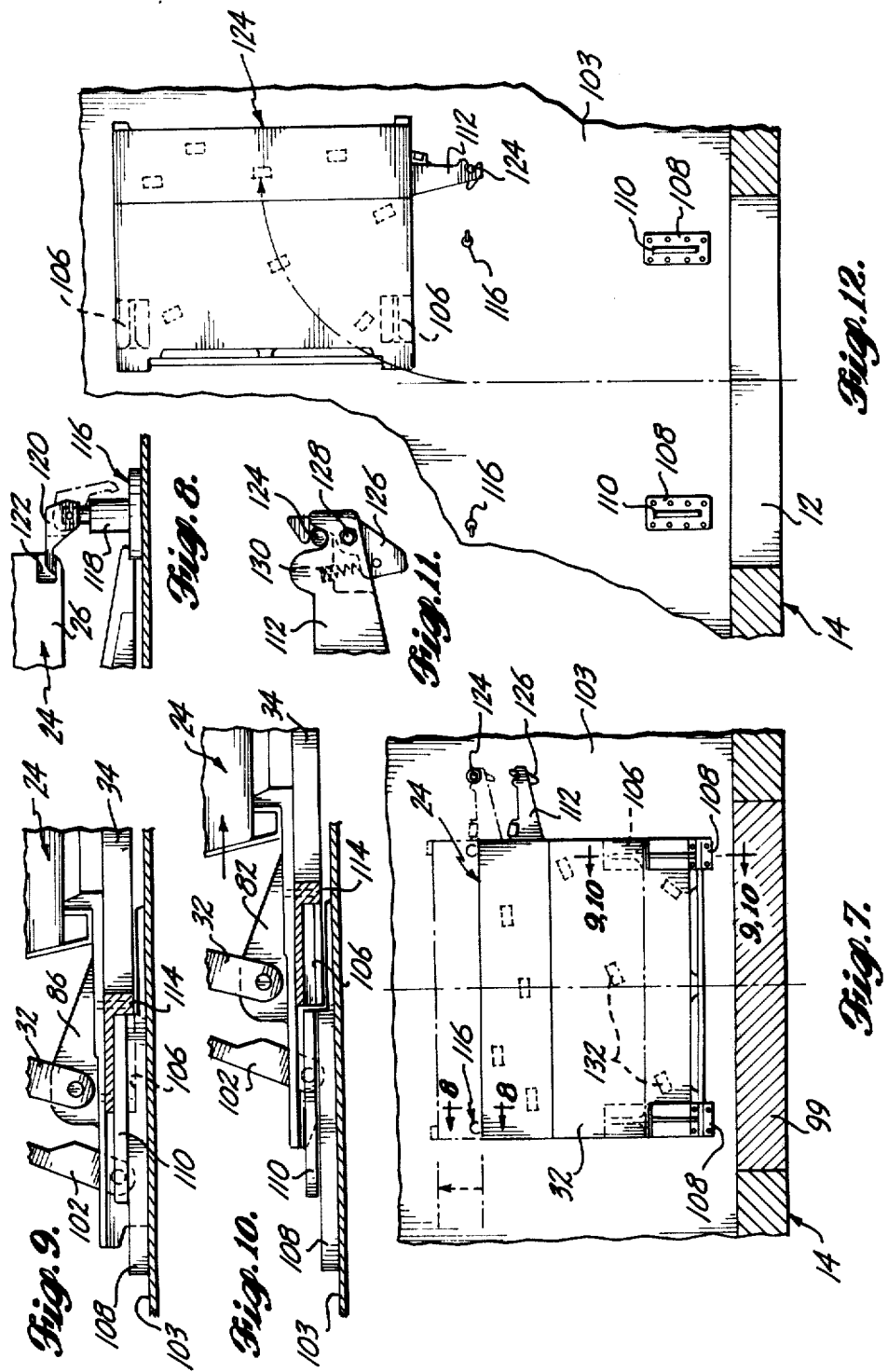

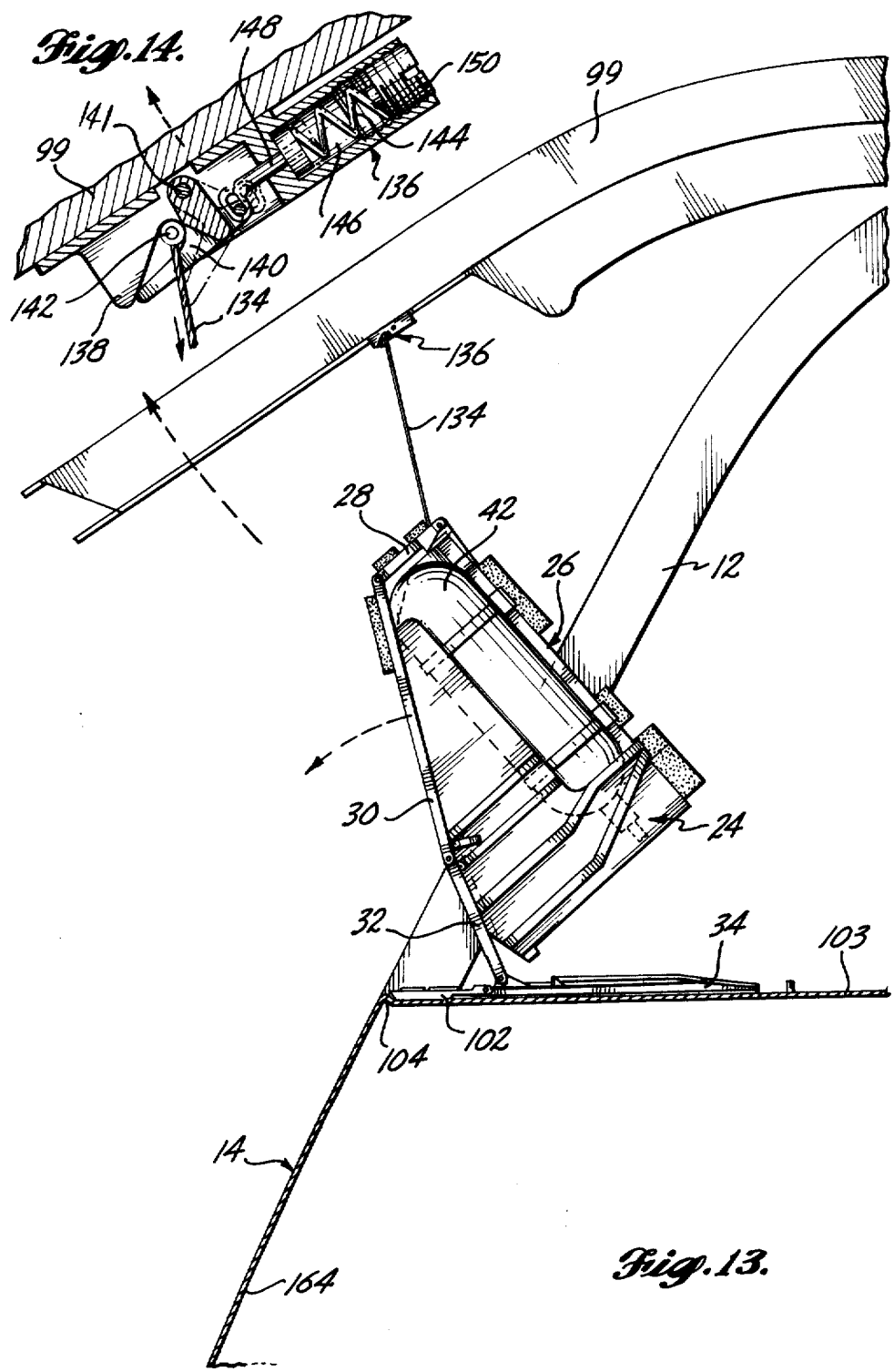

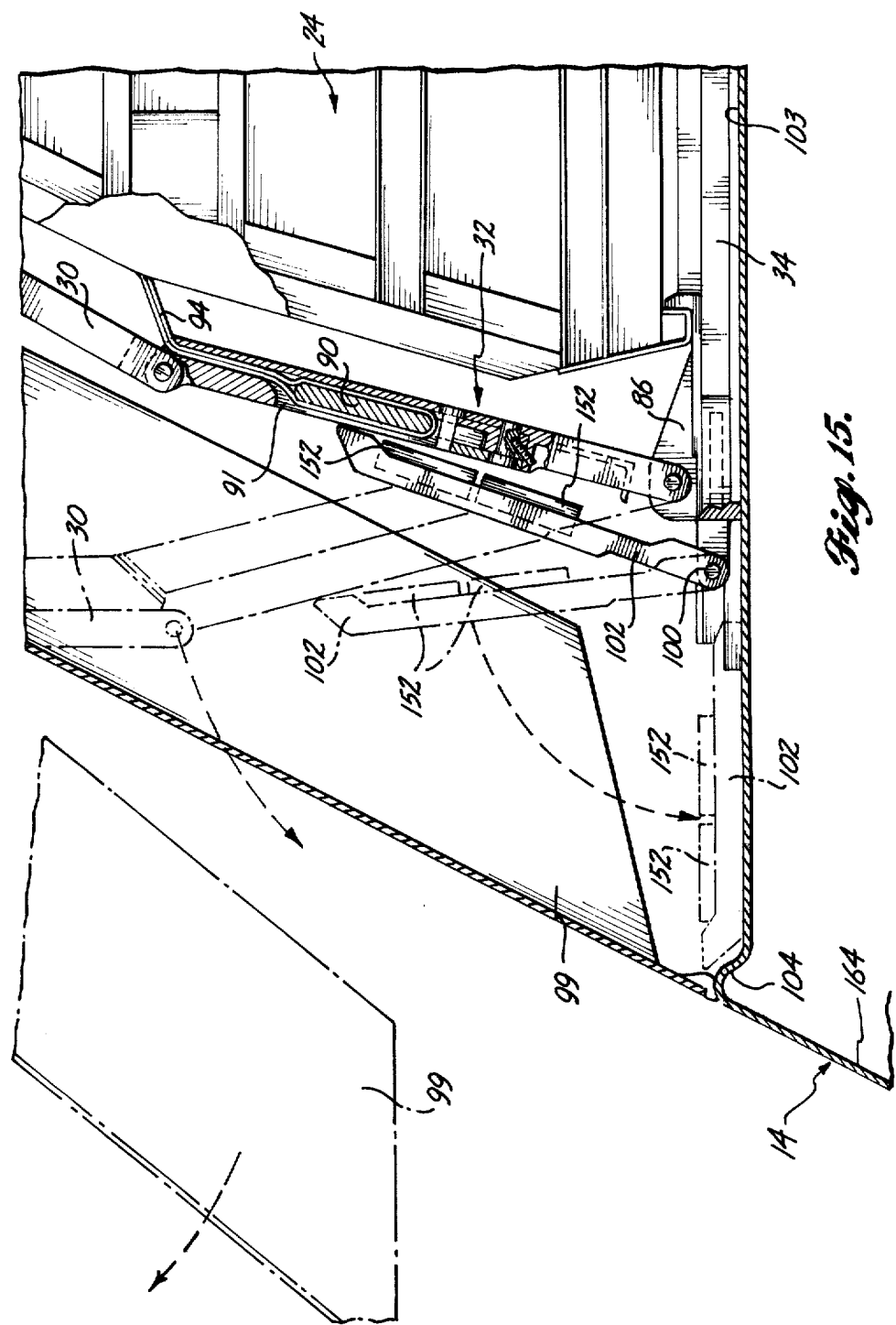

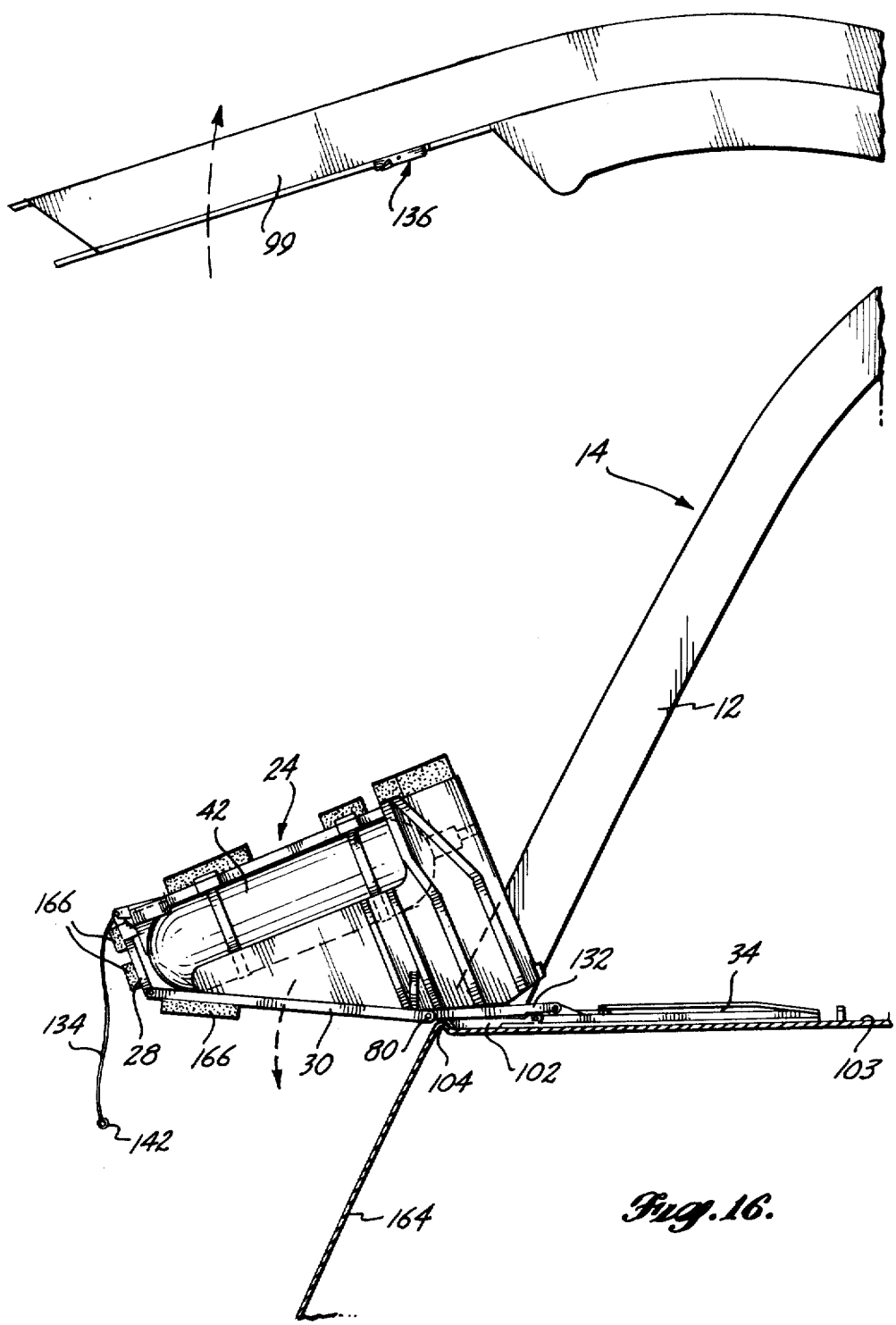

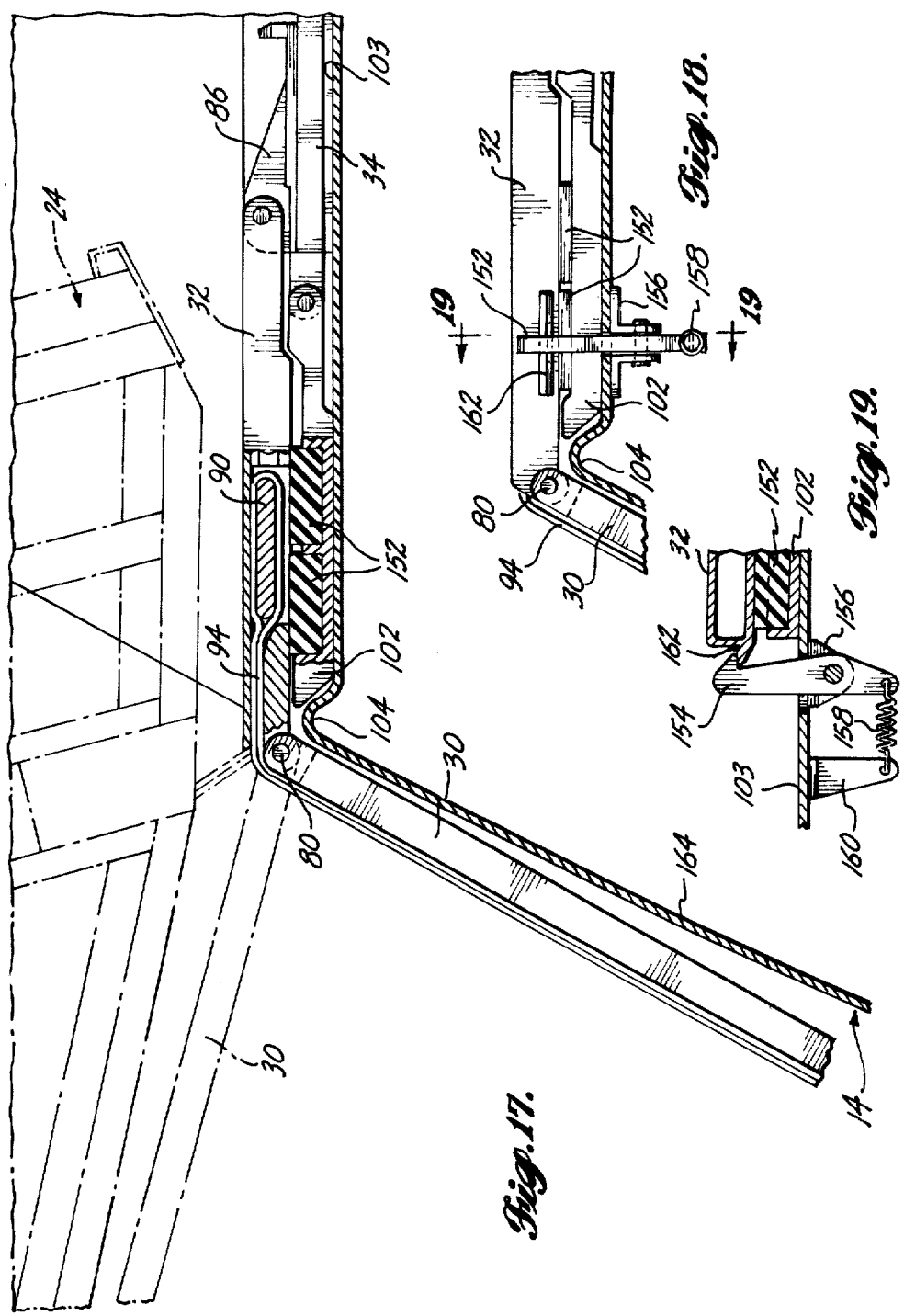

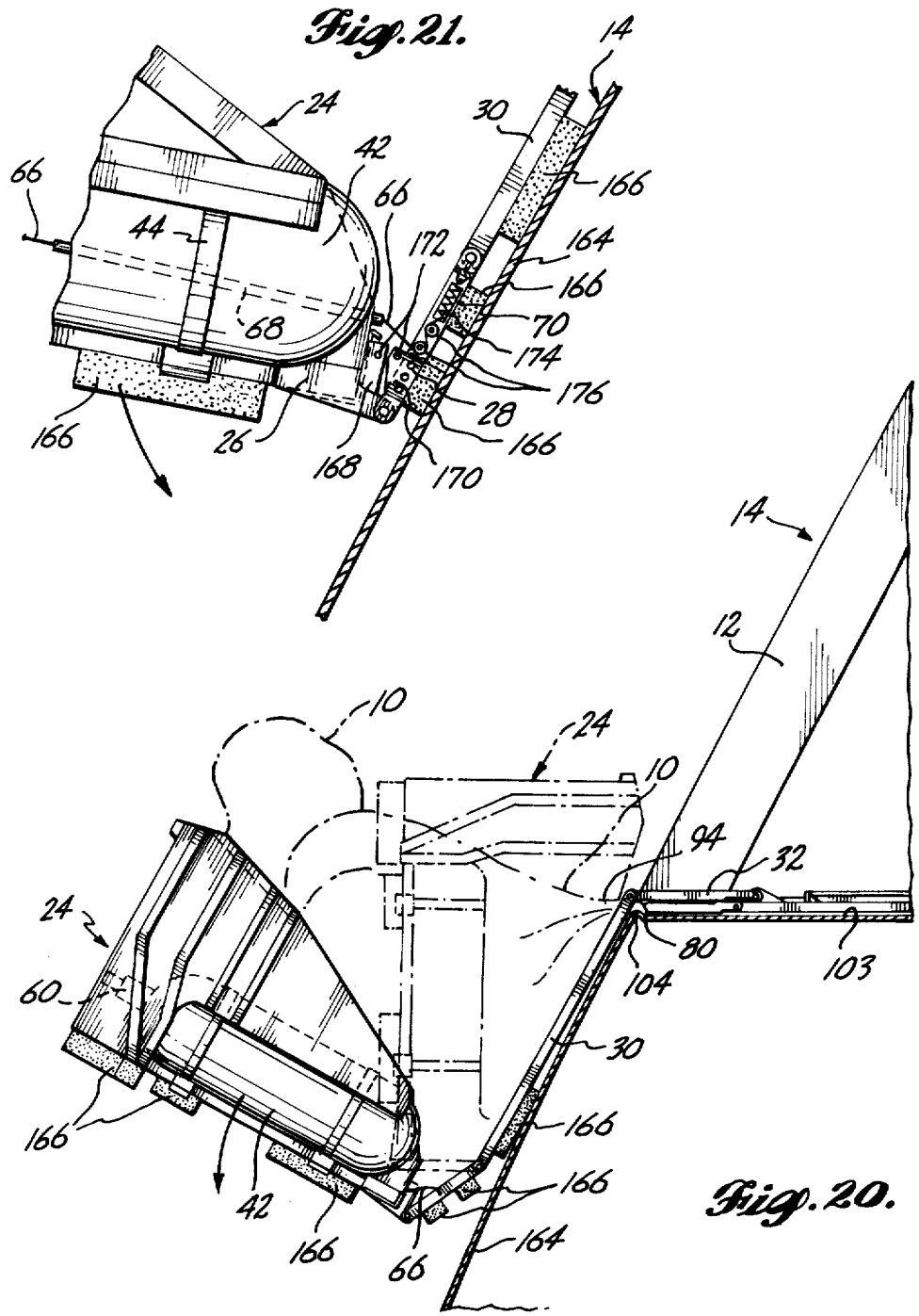

ESCAPE SLIDE STOWAGE AND DEPLOYMENT SYSTEM

BACKGROUND OF THE INVENTION

This invention relates to aircraft emergency evacuation systems employing an inflatable escape slide and more particularly to methods and apparatus for stowing and automatically deploying the inflatable escape slide of such a system.

Emergency evacuation systems that employ inflatable escape slides are installed on virtually all passenger carrying aircraft to provide rapid evacuation of the passengers and crew during on-ground emergencies such as those following an emergency landing or a ditching at sea. During normal aircraft operation, the deflated escape slide is generally packed in a compact package or container that is mounted on the interior surface of the aircraft door or on the floor of the aircraft at a position adjacent the door. In most systems, the upper end of the escape slide includes a girt which encompasses a girt bar that is connected to the aircraft floor at a position immediately inside the door. In the event of an emergency, the door is opened and the escape slide is automatically or manually urged through the doorway and inflated so as to form a slide that extends downwardly from the door sill to the surface of the ground or water.

It can be readily recognized and is well known in the art that numerous design and manufacturing constraints apply to emergency evacuations of the above-described type. For example, the system should be capable of rapid actuation and deployment of facilitate speedy evacuation of the aircraft. Generally, this requires an automatic deployment sequence that is initiated by simply actuating the aircraft door, or by some other simple operation that is easily implemented by a passenger or crew member. To permit use of the door during nonemergency conditions, an arming and disarming device must be provided and, in systems wherein the container or pack containing the deflated slide is not attached to the interior of the aircraft door, means must generally be provided to facilitate movement of the stowed escape slide so as to provide access to the door when the escape slide is not needed.

In addition, various types of doors are employed in modern aircraft and the evacuation system often must be either specifically configured for a particular type of door or must be adapted thereto. For example, in prior art evacuation systems that operate in conjunction with a plug-type door of the variety wherein the door is opened by moving it outwardly and then longitudinally in a direction that is generally parallel to the outside of the aircraft, prior art proposals have included arrangements wherein the stowed evacuation system is positioned adjacent the door so as to be available should an emergency condition develop and proposals wherein the deflated slide is stowed within the lower portion of the door and ejected therefrom as the door is moved outwardly during an emergency evacuation procedure. On the other hand, in the more preferred arrangements for use with overhead doors, the stowed evacuation system is attached to the interior of the door and moves upwardly with the door when it is opened under normal, nonemergency conditions. With this type of arrangement, the stowed evacuation system remains attached to the aircraft floor by means of a girt bar or other fastening arrangement when such an overhead door is moved upwardly for emergency evacuation. As the door reaches a predetermined height, the stowed evacuation system is either forcibly ejected or falls from the door under the force of gravity and the escape slide is inflated by means of aspirators or turbine-type air pumps. In each of these systems, the girt bar usually must be rocked into place in front of the aircraft door to arm the evacuation system and must be disconnected therefrom so that the door can be utilized without deploying the escape slide. Additionally, such system may or may not be usable with or adaptable to various other types of doors such as the upwardly and outwardly swinging emergency door of the type that presently is used with the hereinafter disclosed embodiment of this invention.

Because of the above-mentioned constraints, prior art evacuation systems have often been more complex than desired, requiring, for example, relatively long hoses for interconnecting the inflatable escape slide with a supply of compressed air that is located within the aircraft and relatively complex actuation arrangements for activating the gas supply at a proper time within the system deployment sequence. Further, to stabilize the inflated slide with respect to substantial winds and other environmental forces that could interfere with deployment and use of the system, prior art systems have sometimes required various automatic engagement or hold-down devices that secure portions of the deployment system to the exterior of the aircraft as the inflatable slide is deployed and inflated. Such devices as well as other complex mounting or track arrangements which can be required to facilitate the movement of the deflated, stowed system from a deployable position in front of the door to a position that provides access to the door under nonemergency conditions, have often increased the overall system complexity.

Even further, the prior art systems have been subject to a number of less critical disadvantages and drawbacks. For example, in most systems, the girt bar and its mounting brackets project upwardly from the floor of the aircraft so that a certain degree of care must be exercised as the passengers and crew leave the aircraft. Moreover, in most prior art arrangements, various system components are mounted to the aircraft with the inflatable slide and the remaining portions of the deployment system being packed in or forming the container that is ejected through the aircraft door. Although such a configuration can be satisfactory under some conditions, it is generally more desirable if the evacuation system is arranged as a single unit that can be preassembled and easily installed in the aircraft. Additionally, prior art systems have often required the use of special tools and procedures in order to properly pack the deflated escape slide within the system container or stowage arrangement with minimal risk of damage.

Each of the above-mentioned design constraints becomes even more imposing relative to evacuation systems for large transport aircraft, especially passenger carrying aircraft of the type having both upper and lower passenger decks. In particular, the doors which provide normal and emergency access to (and egress from) the upper deck region of such an aircraft are located a considerable distance from the surface of the ground when the aircraft is fully supported by its landing gear. In emergency landing situations, the normal and emergency exits of the upper deck region can be at a substantially higher elevation if the aircraft comes to rest in a nose-up or in an opposite wing-down attitude. Since it is desirable and necessary to provide for evacuation of the upper deck region regardless of the attitude of the aircraft, a comparatively long escape slide must be utilized. This, of course, reflects on and complicates the above-mentioned problems of satisfactorily stowing and rapidly deploying the escape slide. Moreover, further complications arise in situations wherein an upper deck region is configured to carry a relatively large number of passengers and it is desired or necessary to hide an escape slide of sufficient width to allow two passengers or crew members to descend alongside of one another.

It is therefore a general object of this invention to provide an emergency evacuation system of minimal complexity wherein the inflatable escape slide and all components of the associated deployment mechanism are contained in a single unit that can be readily installed in and removed from an aircraft.

It is another object of this invention to provide an aircraft emergency evacuation system which is suitable for use with and facilitates relatively long and relatively wide inflatable escape slides that are suitable for evacuating the upper deck region of a large transport aircraft.

It is a still further object of this invention to provide an aircraft emergency evacuation system wherein a relatively large escape slide is automatically deployed as an upwardly and outwardly swinging aircraft escape door is actuated and wherein the entire evacuation system forms a single unit that is stowed along the lower portion of the interior surface of the escape door.

Even further, it is an object of this invention to provide an emergency evacuation system of the above-mentioned type wherein rapid and reliable deployment of an inflatable escape slide is attained without the need for and use of devices that automatically secure the deployed escape slide to the exterior surface of the aircraft.

Moreover, it is an object of this invention to provide such an emergency evacuation system wherein the system is easily armed and disarmed without separate engagement or disengagement of the system girt bar with the aircraft floor and wherein the girt bar does not project upwardly from the aircraft floor during emergency evacuation procedures.

SUMMARY OF THE INVENTION

These and other objects are achieved in accordance with this invention by configuring the emergency evacuation system so that the deflated escape slide and the compressed gas supply and turbine-type pumps for inflating the escape slide are contained in a stowage pack that is formed by the plurality of hinged-together, substantially rectangular deployment links and the packboard that facilitate system deployment. More specifically, in the disclosed embodiment of the invention, the system packboard is basically a shell-like structure having a bottom panel, two upwardly extending side panels and a back panel that interconnects the two side panels. When the system is assembled for stowage in the aircraft, the substantially rectangular, hinged-together deployment links extend between the packboard bottom and back panels to form the top and fourth side surface of the stowage pack, with the longitudinal edge of one of the deployment panels being hinged to the upper edge of the packboard back panel. In this regard, to facilitate stowage of the evacuation system in a positon closely adjacent an outwardly and upwardly swinging escape door, the forward edges of the packboard side panels extend upwardly from the packboard bottom panel and are angularly directed toward the packboard back panel. For example, in the disclosed arrangement wherein three hinged-together deployment links are deployed, the forward edge of each packboard side panel defines two angularly extending sections so as to closely approximate the curvature of the lower portion of the associated aircraft door. In this arrangement, one of the rectangular deployment links forms the top surface of the stowage package and the two remaining deployment links extend along the two angularly projecting regions of the packboard side panels to form the forward face of the system stowage pack.

Regardless of the number of deployment links employed and the exact configuration of the packboard side panels, the longitudinal edge of the lowermost deployment link is hinged to one edge of a base plate that can be securely interconnected with the aircraft floor at a position adjacent to the associated escape door. In particular, the base plate, deployment links and packboard are interconnected so that the deployment links permit the packboard to swing arcuately downward and against the outer surface of the aircraft fuselage in a manner described in more detail hereinafter when the system stowage pack is urged outwardly through the opening formed by the associated aircraft door. In addition, the system base plate is preferably configured and arranged to permit the evacuation system stowage pack to be moved away from the door with relative ease so that the door can be utilized for aircraft servicing and other nonemergency uses. In this regard, to securely interconnect the base plate of the disclosed embodiment with the floor of the aircraft when the evacuation system is in the stowed, ready-to-use condition, two spaced apart T-shaped rails that are substantially perpendicular to the axial centerline of the aircraft are engaged in two track-like channels in the lower portion of the evacuation system base plate. When the stowed evacuation system stowage pack is engaged with the rails and pushed into position adjacent the emergency door, a spring-loaded latch assembly that is mounted to the floor of the aircraft is engaged with a suitable fixture on the base plate to securely lock the stowed system in proper position. If it is necessary to move the stowed escape slide away from the door, the spring-loaded latching device is disengaged and the entire stowage pack is pulled inwardly along the floor-mounted rails. When the stowage pack has been moved inwardly by a distance which allows the pack to be swung substantially about one corner thereof, the base plate leaves the rails and drops onto a series of small rollers that are mounted on the bottom side of the base plate. At this same time, a pivot arm that extends outwardly from the base plate comes into contact with and engages a pivot pin that extends upwardly from the aircraft floor. The stowed emergency evacuation system can then be readily swung about the pivot pin with the rollers permitting a single crew member to move the stowed unit into a position which allows easy access to the aircraft door.

Regardless of the exact configuration of the system base plate, the deflated escape slide is foled or otherwise placed in the cavity defined between the packboard and the deployment links. To provide an interconnection between the escape slide and the deployment system (hence the aircraft), the fabric girt that is formed in the upper end of the escape slide encompasses a girt bar that spans a rectangular slot or notch in the bottommost deployment link (i.e., the deployment link that is hinged to the base plate). A manifold that is integrally formed in the upper end of the escape slide or other such means interconnects the various inflatable cells or tubes of the escape slide with a plurality of pneumatically driven turbine-like air pumps or aspirators that are mounted to the bottom panel of the packboard assembly. Each of the air pumps is driven by a suitable compressed gas supply which is coupled to the air pump drive elements via appropriate valving and actuated at the proper point in the deployment system. In the disclosed embodiment of the invention, four turbine-type air pumps or fans are mounted to the bottom panel of the system packboard and two cylinders of compressed gas are strapped in upwardly extending contoured regions that are formed in the packboard back panel so that one such contoured region is defined adjacent each of the packboard side panels. Preferably, to minimize the weight of the evacuation system, the packboard is constructed of relatively thin material and the compressed gas cylinders are securely clamped in place to structurally reinforce the entire packboard assembly.

In operation, the emergency evacuation system is stowed in the above-mentioned manner and is secured to the aircraft floor adjacent to the interior of the associated emergency door. In the disclosed arrangement, wherein the invention is utilized with an outwardly and upwardly swinging emergency door, a deployment lanyard having one end thereof connected to the upper portion of the packboard is utilized to urge the stowage pack and hence the escape slide, packboard and the deployment links outwardly across the aircraft door sill as the emergency door is swinging toward its open position. In particular, the second end of the deployment lanyard is inserted into an arming mechanism which is located on the interior of the emergency door and is configured and arranged to retain the lanyard unless it is placed under tension in a particular direction. As the emergency door begins to swing upwardly, the lanyard comes under tension and tips the evacuation system stowage pack about the hinge between the system base plate and the lowermost deployment link. As the stowage pack center of gravity passes outwardly through the aircraft door, the lanyard asserts tension on the system arming device in a direction which pulls the lanyard from the arming device and the stowage pack falls under the force of gravity. When the lower deployment link comes into contact with the aircraft sill region, the hinge between the lowermost and centermost deployment links is positioned slightly outside of the aircraft and the system continues to swing downwardly, pivoting about this hinge point. As the central deployment panel swings downwardly and comes into contact with the exterior of the aircraft, the upper end of the escape slide is pulled from its stored condition since the escape slide girt is interconnected with the girt bar which is included in the deployment link which now rests atop the aircraft sill region. Inflation of the escape slide does not begin however until the packboard has swung downwardly so that each of the deployment panels is in contact with the exterior surface of the aircraft. In particular, in accordance with the disclosed embodiment of the invention, the valves which supply compressed gas to drive the turbine-type fans and inflate the escape slide are actuated by trigger lanyards that extend upwardly from the valves to the deployment link which is hinged to the rear panel of the packboard. As the two final deployment links swing into position against the aircraft and the packboard begins to swing about the hinge between the packboard and the final deployment link, the trigger lanyards come under tension and open the associated valves to thereby rapidly inflate the escape slide. To ensure that premature inflation does not occur, the deployment link which actuates the trigger lanyards and the upper portion of the packboard are interconnected by a shear pin that breaks away as the packboard comes into the proper position.

To provide additional stabilization of the escape slide during deployment and during use, the deployment link which rests on the aircraft sill region and contains the system girt bar is preferably secured to the aircraft floor as it swings into place. In the disclosed embodiment of the invention, the desired automatic latching operation is effected by spring-loaded pawl-like members that extend upwardly from the floor and are pivotable about an axis that is parallel to a corresponding lip region on the deployment panel. As the deployment panel falls into position, the pawl-like catches engage the lip region and prevent the associated deployment panel from rebounding upwardly as the escape slide and packboard pivot about the remaining hinge points and impact with the exterior of the aircraft in the above-described manner. Additionally, the system is dimensioned and arranged such that the escape slide girt comes under tension as the escape slide reaches a fully inflated condition to thereby force the upper end of the escape slide, the extended deployment links and the packboard securely against the aircraft.

BRIEF DESCRIPTION OF THE DRAWING

These and other aspects of the present invention will be apparent to one skilled in the art upon reading the following description taken together with the accompanying drawings in which:

FIGS. 7-12 depict further details of the system base plate, the mounting rails and track, and associated components which permit the evacuation system to be secured in the stowed position of FIG. 4 or, alternatively, swung away from the emergency door to permit access to and from the aircraft for servicing or other operations;

FIG. 13 illustrates the initial step of the system deployment sequence wherein the stowed evacuation system is swung outwardly through the opening in the aircraft as the emergency door begins to swing upwardly;

FIG. 14 is an enlarged cross-sectional view of the arming mechanism that is attached to the interior of the emergency door to retain one end of the deployment lanyard which urges the evacuation system outwardly through the door opening as the emergency door is swung upwardly;

FIG. 15 is a more detailed illustration of the forward portion of the system base plate and the deployment link that is hinged thereto, with phantom lines being utilized to indicate the movement of these components that occurs as the system deployment sequence is initiated;

FIG. 16 illustrates the system as the packboard and deployment links begin to fall under the force of gravity;

FIGS. 17-19 are partial cross-sectional views which illustrate various aspects of the system as the packboard and deployment links reach the point in the deployment sequence that is depicted in FIG. 16;

FIGS. 20 and 21 illustrate the packboard and associated components of the system at the point in the deployment sequence wherein the system compressed gas supply is actuated to inflate the escape slide;

DETAILED DESCRIPTION

Figure 1:
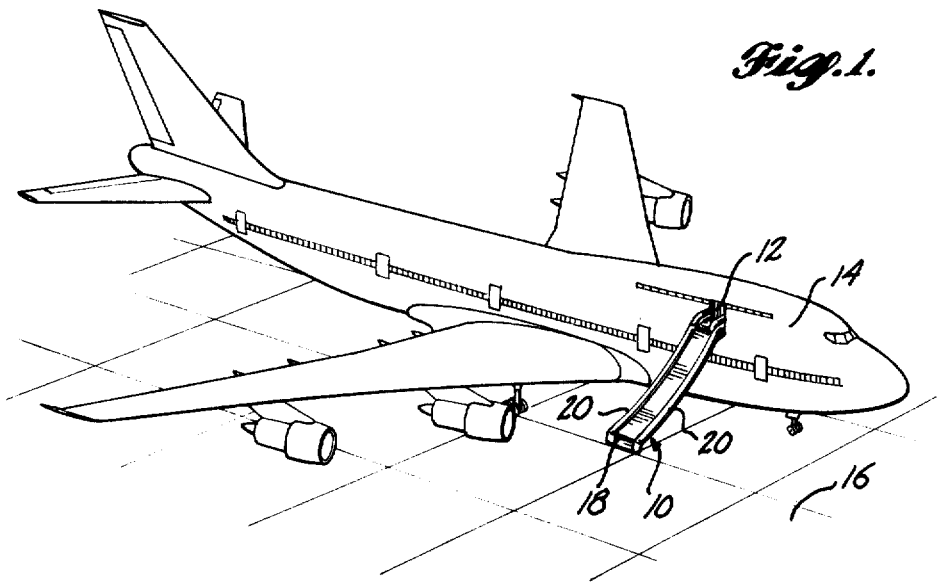
FIG. 1 depicts an emergency evacuation system of the type that forms the subject matter of this invention with the evacuation system escape slide being deployed from an emergency door in the upper passenger deck of an aircraft and with the aircraft being shown in normal on-ground attitude.

Referring now to FIG. 1, the presently preferred embodiment of the invention addresses an emergency evacuation system of the depicted type wherein an inflatable escape slide 10 is deployed to extend between the ground 16 and a door opening 12 which forms an emergency exit from the upper deck of an aircraft 14. The escape slide 10 is a conventional, inflatable slide which generally includes a plurality of longitudinally extending cylindrical cells that are constructed of a coated fabric material and covered with a coated panel which forms a slide platform 18. Additional longitudinally extending inflated cylindrical cells form side rails 20 along the outer edges of the slide platform 18 to prevent passengers and crew members from falling over the edges of the escape slide as they evacuate the aircraft. As is known in the art, additional longitudinally or laterally extending inflated cells (not shown in FIG. 1) are often utilized to reinforce such an escape slide and to partially stabilize the slide during a deployment sequence in which the escape slide is expelled through the door opening 12 and inflated.

Figure 2:
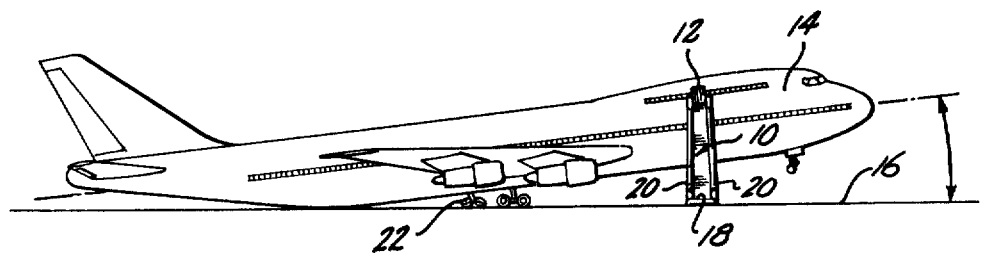
FIGS. 2 and 3 depict the fully deployed condition of an emergency evacuation system in accordance with this invention with the aircraft being shown in the nose-up and nose-down attitudes which can result during emergency landing procedures, respectively.
Figure 3:
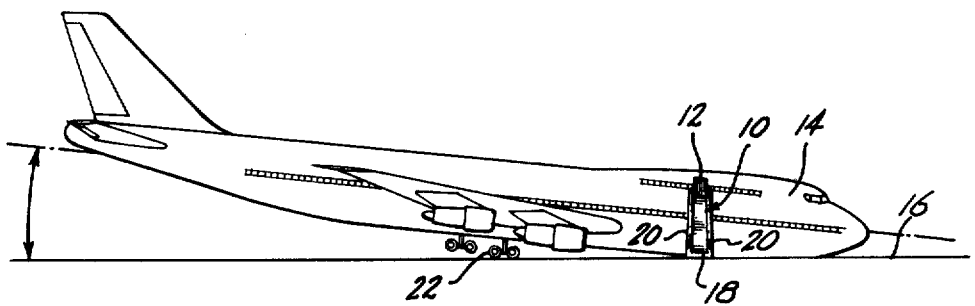

As is depicted in FIGS. 2 and 3, evacuation systems constructed in accordance with this invention are preferably arranged so that a suitable sliding surface 18 will be provided for various on-ground attitudes of the aircraft 14. In this regard, the length of the escape slide 10 is established so that escape slide 10 is at a satisfactory angle regardless of whether the aircraft comes to rest in a nose-up attitude such as can occur, for example, if a portion of the main landing gear 22 collapses (FIG. 2), or whether the aircraft is in a nose-down attitude (FIG. 3) because, for example, of a collapsed nose gear.

Figure 4:
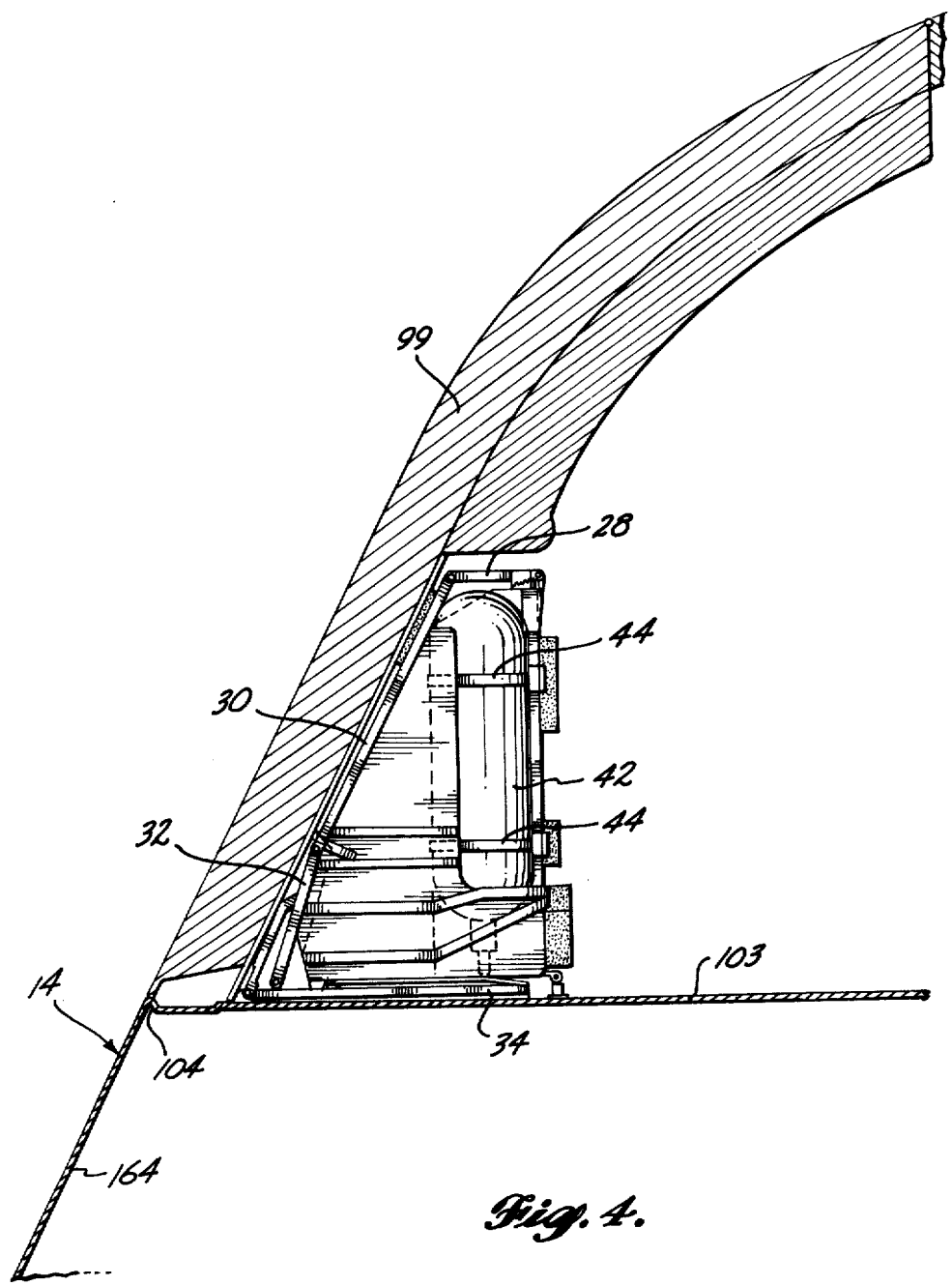
FIG. 4 is a side elevation view depicting the emergency evacuation system in a stowed, ready-to-use condition adjacent the associated emergency door.
Figure 5:
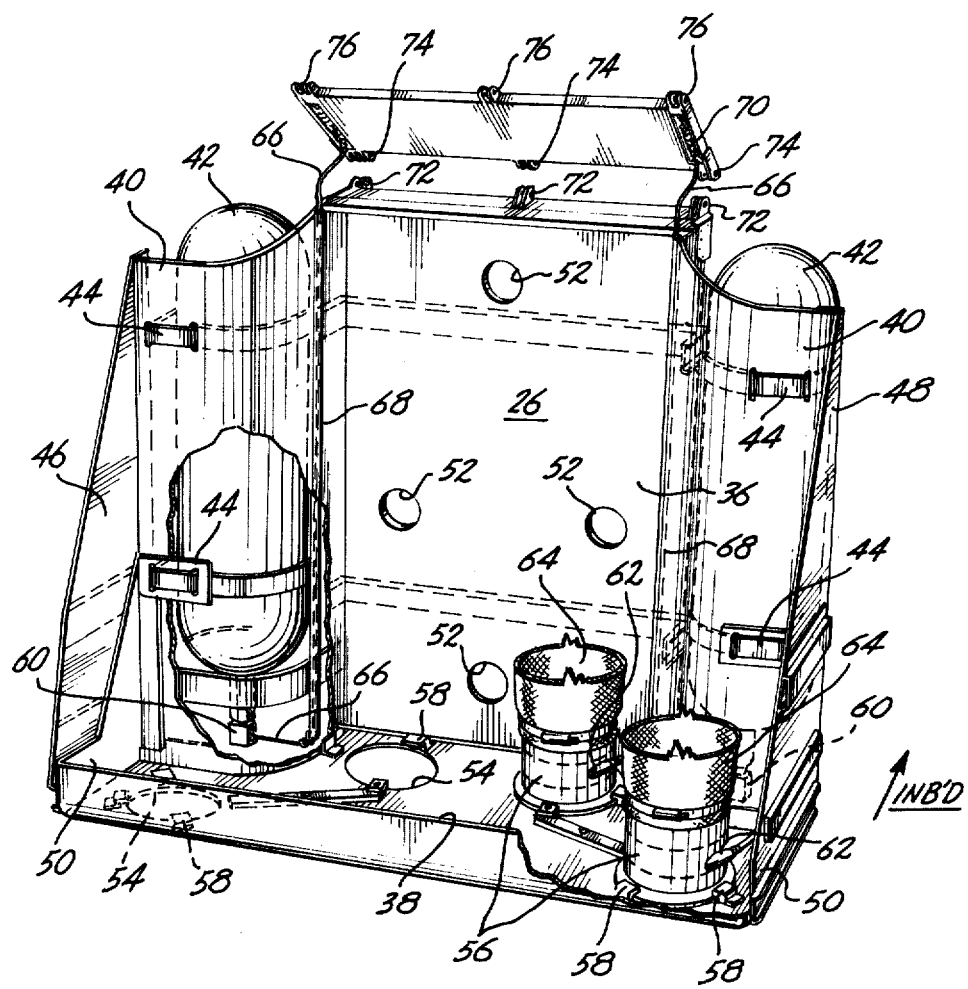
FIG. 5 is a partially cut-away isometric view of the system packboard which depicts the compressed gas cylinders and associated pneumatically driven turbine-like fans for inflating the escape slide and also depicts the deployment link that is hinged to the packboard and actuates the inflation system.
Figure 6:
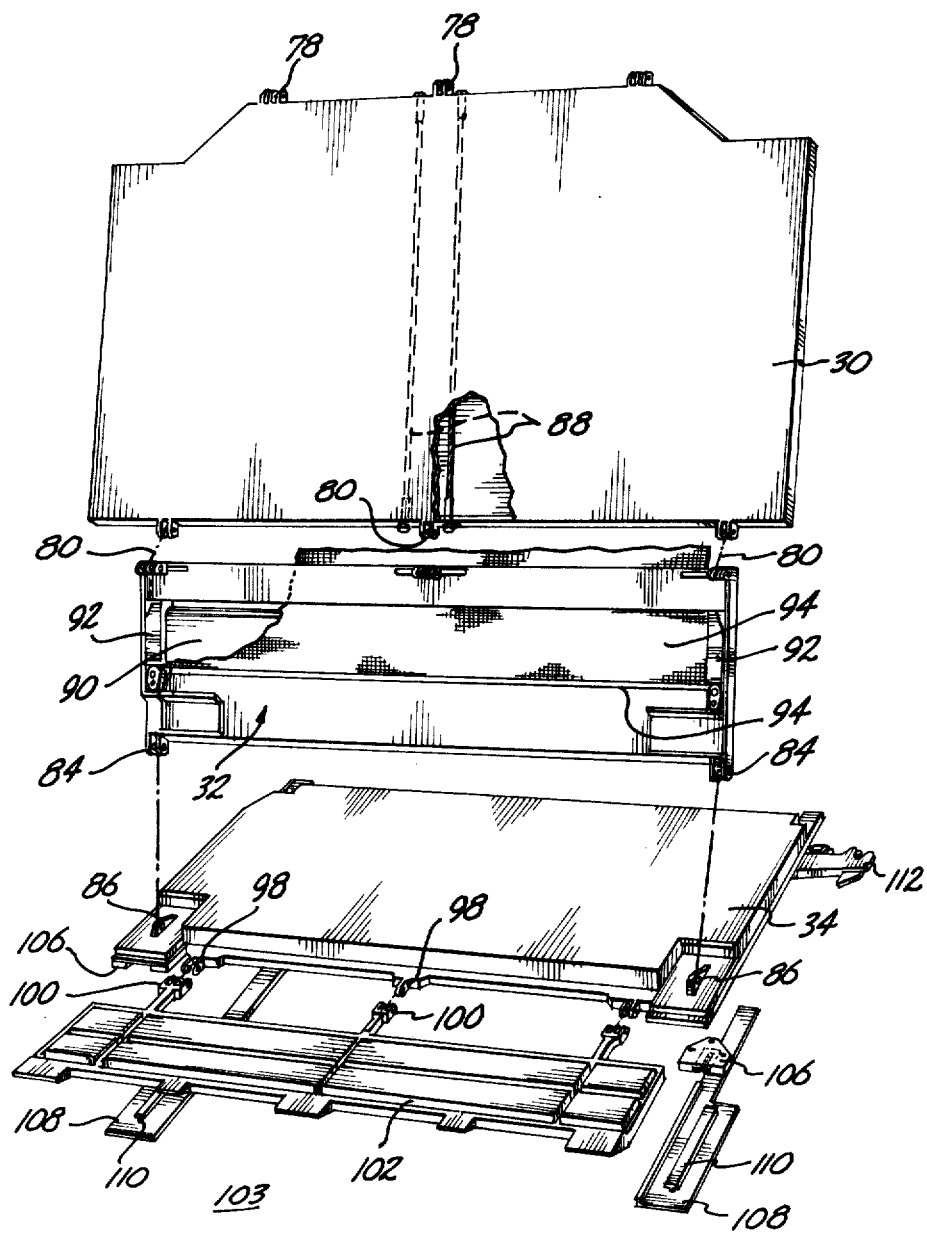
FIG. 6 is an exploded, isometric view which illustrates the system base plate, the track and rail arrangement that secures the base plate to the floor of the aircraft, and two hinged-together deployment links which couple the base plate to the deployment link depicted in FIG. 5.

The manner in which the present invention is configured and arranged to rapidly and reliably deploy the escape slide 10 in the manner depicted in FIGS. 1-3 can be understood with reference to the remaining figures and the hereinafter described deployment sequence. Referring first to FIGS. 4-6, the emergency evacuation system of this invention is configured and arranged to conform a relatively compact stowage pack 24 which is formed by and contains substantially all elements of the evacuation system. More specifically, the outer boundaries of the stowage package 24 are formed by the system packboard 26, a series of three hinged-together deployment links (28, 30 and 32) and a base plate assembly 34. As is illustrated most clearly by FIG. 5, the packboard assembly 26 is formed of relatively thin material and includes a rear panel 36 that extends upwardly from a relatively rectangular bottom panel 38. Vertically extending contoured regions 40 that are formed in the outermost portions of rear panel 36 facilitate storage of two compressed gas cylinders 42. As is indicated in both FIGS. 4 and 5, the gas cylinders 42 are secured to the packboard assembly 26 by a pair of spaced apart metal straps 44 that are connected to the packboard rear panel 36 and extend circumferentially about each of the gas cylinders 42. Preferably, the straps 44 include conventional screw actuated tighteners or other clamping devices that permit the gas cylinders 42 to be easily replaced. In any case, securing the gas cylinders 42 to the packboard 26 with the straps 44 not only maintains the gas cylinders in their proper position during the hereinafter deployment sequence, but also substantially increases the structural rigidity and integrity of the packboard assembly 26.

With continued reference to FIG. 5, gusset-like side panels 46 are rivetted or otherwise fastened between a flange 48 that extends orthogonally from the edges of rear panel 36 and a flange 50 that extends orthogonally upwardly from the packboard bottom panel 38. If desired or necessary, a series of openings or lightning holes 52 can be included in the packboard rear panel 36, the packboard bottom panel 38 and/or the packboard side panels 36 to further reduce the weight of the evacuation system. Further, bottom panel 38 includes four substantially circular air inlet openings 54 for supplying ambient air to pneumatically driven turbine-type air pumps or fans 56. As is indicated in FIG. 5, each turbine-type fan 56 is connected to the packboard bottom panel 38 by conventional means such as the depicted T-shaped hold-down brackets 58 and is driven by high-pressure gas that is supplied by the gas cylinders 42 via selectively operable valves 60 and conventional pneumatic tubing 62. To direct the airflow that exits turbine-type fans 56 into escape slide 10, tubes 64 that are integrally formed in the escape slide in a known manner to generally define an inflation manifold for the escape slide extend circumferentially about and are clamped to the exhaust openings of the turbine-type fans 56.

In the depicted arrangement, the selectively operable valves 60 are of the type which can be actuated by pulling a spring-loaded pin or other element, with such element being connected to a trigger lanyard 66 that extends from the valve 60 and then upwardly through the central opening of relatively small tubes 68 that are attached to the packboard rear panel 36. The upper end of the trigger lanyards 66 are secured to the edge regions of deployment link 28 by a spring assembly 70. As shall be described relative to the evacuation system deployment sequence, the trigger lanyards 66 are placed under tension to activate the valves 60 and inflate the escape slide 10 when deployment link 28 and packboard assembly 26 swing away from one another about the hinges which join deployment link 28 to rear panel 36 of packboard assembly 26. In this regard, as is shown in FIG. 5, rear panel 36 includes three spaced apart hinge elements 72 which are positioned to intermesh with hinge elements 74 that are fastened to or formed in one longitudinal edge of deployment link 28. Similar hinge pairs 80 interconnect deployment link 30 with deployment link 32 and bifurcated hinge plates 84 as the opposite edge of deployment link 32 are interconnected with upwardly extending hinge brackets 86 on base plate 34. Thus, as is illustrated most clearly in FIG. 4, deployment links 28, 30 and 32 form the upper surface and an angularly extending front surface of the stowage pack 24, with space being provided for storing the deflated escape slide (not shown) in the region between packboard 26 and deployment links 30 and 32.

In the presently utilized embodiment of the invention, deployment links 28 and 32 are machined from aluminum alloy in a conventional manner and deployment link 30 is a monocoque structure of known type wherein relatively thin metal sheets are fastened to internal frame members to thereby provide a structure of relatively high-strength weight ratio. In the present embodiment, the strength and structural rigidity of the monocoque structure of deployment link 30 is further improved by two spaced apart cables 88 that are connected between the upper and lower edges of deployment link 30 and are placed under tension during fabrication of deployment link 30.

With continued reference to FIG. 6, the system girt bar 90 is mounted in a generally rectangular recess 91 that extends longitudinally across the central section of deployment link 32. In the depicted arrangement, girt bar 90 is retained in position by mounting brackets 92 which are fastened to deployment link 32 and encircle each end of girt bar 90. As is further illustrated, the escape slide girt 94 encircles girt bar 90 to thereby interconnect the upper end of the escape slide 10 with a portion of the system that is interconnected to the aircraft in the hereinafter described manner. As is illustrated in FIGS. 15 and 17, the escape slide girt 94 passes through a longitudinally extending slot that extends from one longitudinal edge of deployment link 32 to one sidewall of recess 91, with girt 94 encircling girt bar 90 in the previously mentioned manner. As shall become apparent upon understanding the hereinafter described deployment of the invention, this arrangement protects the escape slide girt from damage and, more importantly, provides a relatively smooth, obstacle-free approach to the upper end of the deployed escape slide.

As previously mentioned, hinge brackets 86 or the forward edge of base plate 34 pivotably interconnect base plate 34 to deployment link 32. In addition, the forward edge of base plate 34 includes three forwardly projecting hinge brackets 98 which are pinned in matching hinge brackets 100 that are spaced apart along and project outwardly from one longitudinal edge of a sill plate 102. Sill plate 102 is generally rectangular in geometry and, as is illustrated and described hereinafter, is dimensioned to fill or bridge the region between base plate 34 and the sill 104 of the aircraft emergency door 99 (FIG. 4) when the system is deployed.

FIG. 6 also illustrates the manner in which base plate 34 and hence the emergency evacuation system is fastened to the aircraft floor 103 to thereby position the stowage pack 24 adjacent the emergency door 99 and maintain the evacuation system securely fastened to the aircraft when it is deployed. In this regard, a slider block 106 having a T-shaped track or channel machined therein is mounted to the bottom of base plate 34 at each forward corner thereof with the T-shaped track extending substantially perpendicular to the forward edge of base plate 34. Floor brackets 108, having an upwardly extending T-shaped rail 110 are mounted on the aircraft floor 103 so that the slider blocks 106 can be engaged with the T-shaped rails 110.

Slider blocks 106 and floor brackets 108 not only secure the evacuation system base plate 34 to the aircraft floor 103 as depicted in FIG. 4, but in conjunction with a latch arm 112 that extends orthogonally from the rear portion of base plate 34, permit the evacuation system stowage pack 24 to be easily moved away from the emergency door 99 when the door is to be opened under nonemergency conditions. More specifically and with reference to FIGS. 7-12, when the evacuation system stowage pack 24 is in the stowed position adjacent the emergency door 99 (shown by the solid lines in FIG. 7), the slider blocks 106 are fully engaged with the T-shaped rails 110 of floor brackets 108. As is shown by the cross-sectional view of FIG. 9, slider blocks 106 preferably include a downwardly extending stop region 114 which abuts with the inboard end of the T-shaped rail 110 when the stowage pack 24 is in the stowed, ready-to-use position indicated in FIG. 7 and further illustrated in FIG. 4. To further secure the stowage pack 24 in its stowed position, a spring-loaded latch 116 is mounted to the aircraft floor 103 at a position that is slightly inboard of one rear corner of stowage pack 24 (when the system is in the proper stowed, ready-to-use position). As it is shown in the enlarged view of FIG. 8, a suitable arrangement for latch 116 includes a pedestal-like mount 118 that is connected to the aircraft floor 103 and an upwardly extending spring-loaded pawl-like arm 120 that is pivotably attached to mount 118. As is indicated by the solid lines of FIG. 8, the spring-loaded arm 120 can be pivoted into engagement with a recess or slot 112 in packboard 26 to thereby latch stowage pack 24 in position. As is indicated by phantom lines, the pawl-like arm 120 can be pivoted away from slide pack 24 and turned downwardly so that slide pack 24 can be moved away from the door 99.

As is indicated by the phantom lines in FIG. 7 and by the associated cross-sectional view of FIG. 10, when slide pack 24 is urged inwardly (in the inboard direction), slider blocks 106 move along the T-shaped rails 110 of floor brackets 108 until slider blocks 106 disengage from floor brackets 108. At this point, latch arm 112 comes into contact with and engages a pivot pin 124 that extends upwardly from the aircraft floor 103. More specifically, as is illustrated in FIG. 11, the outward end of latch arm 112 includes a latch plate 126 that is pivotably connected to latch arm 112 by a bolt or other fastener 128. A spring 130 biases latch plate 126 so that a substantially circular opening is defined between one edge of latch arm 112 and latch plate 126. As the portion of latch plate 126 that is adjacent this opening contacts the upwardly extending pivot pin 124, latch plate 126 compresses spring 120 and encompasses pin 124. When pin 124 has passed into the substantially circular region between latch plate 126 and latch arm 112, spring 130 forces latch plate 126 to encompass pin 124 so as to provide a pivot point for swinging stowage pack 24 away from the aircraft door 99.

More specifically, as is indicated in FIGS. 7 and 12, a plurality of small wheel or rollers 132 are mounted to the lower face of base plate 34. Wheels 132 come into contact with the aircraft floor 103 as the stowage pack 24 is moved inwardly and slider blocks 106 disengage from floor brackets 108 in the above-described manner. Preferably wheels 132 are mounted along two or more axes which allow stowage pack 24 to be easily moved in a direction perpendicular to the aircraft door 99 and easily swung about pivot pin 124. Thus, as is indicated in FIGS. 7 and 12, as latch plate 126 of latch arm 112 engages pivot pin 124, slide pack 24 can be swung arcuately about pivot pin 124 to thereby provide access to door opening 12.

Turning now to operation of the invention to automatically deploy escape slide 10 (FIGS. 1-3) as the aircraft door 99 is opened, the system stowage pack 24 is first installed to the aircraft 14 and secured in the stowed, ready-to-use position described above and depicted in FIGS. 4 and 7. Additionally, the emergency evacuation system is armed for automatic deployment by interconnecting the system stowage pack 24 with the aircraft door 99. More specifically, as depicted in FIGS. 13 and 14, the system is armed and actuated by a deployment lanyard 134 that extends from the upper edge of the system packboard 26 to an arming and actuation unit 136 that is mounted on the interior surface of the door 99. As shown in the cross-sectional view of FIG. 14, arming and actuation unit 136 includes a flange 138 that extends inwardly and away from the surface of the aircraft door 99 so that the inboard edge of flange 138 defines a ramp-like surface that forms a predetermined angle with the inner surface of door 99. A substantially L-shaped retention and release arm 140 is pivotably attached to flange 138 for movement between a position in which the inner edge of the major leg thereof is substantially parallel to the ramp-like surface of flange 138 and a position in which the end portion of the major leg thereof abuts with the ramp-like surface of flange 138. As is illustrated by the solid and phantom lines of FIG. 14, a barrel-like retention pin 142 that is attached to the outer end of deployment lanyard 134 is held captive by retention and release arm 140 when it is in abutment with flange 138 and is released when retention and release arm 140 is pivoted away from flange 138. The lanyard 134 extends through a slot in the end portion of the retention and release arm 140 behind which pin 142 is held.

The retention and release arm 140 is subject to a force delivered by a compression spring 144 acting through a piston-like actuation arm 148. As shown in FIG. 14, actuation arm 148 is connected to retention and release arm 140 in such a manner that the force delivered by compression spring 144 acts across pivot 141 and opposes the force supplied by tension in lanyard 134. The force supplied by compression spring 144 tends to maintain the retention and release arm 140 in the closed position until the tension in the lanyard, which increases during the deployment operation described below, overcomes the spring force and opens the retention and release arm. An end cap 150 maintains compression spring 144 in the cavity 146. As is indicated in FIG. 14, end cap 150 can be threaded to engage with threads in the interior wall of cavity 146 to thereby permit adjustment of the force exerted on retention and release arm 140 and hence adjustment of the force required to pull deployment lanyard 134 and retention pin 142 from arming and actuation unit 136.

In view of the above description of deployment lanyard 134 and arming and actuation unit 136, it can be recognized that the evacuation system stowage pack 24 will be tipped about the hinge connection between base plate 34 and deployment link 32 as the aircraft door 99 begins to swing upwardly. More specifically, as is depicted in FIG. 13, arming and actuation unit 136 is mounted at a position on the interior of aircraft door 99 which causes stowage pack 24 to tip outwardly through door opening 12 as the door 99 is opened under emergency conditions. In this regard, it can be seen that as door 99 swings slightly above the position shown in FIG. 13, the center of gravity of stowage pack 24 passes outwardly through the door opening 12 and lanyard 134 comes into a position in which it is substantially parallel to the ramp-like edge of flange 138 of arming and actuation unit 136. At this point, tensional force in lanyard 134, which is caused by the weight and momentum of stowage pack 24 as it tips beyond its point of balance, causes retention and release arm 140 to compress spring 144 by an amount which permits retention pin 142 to be pulled from arming and actuation unit 136. Stowage pack 24 is thus free to fall from the door opening 12 under the force of gravity.

FIG. 15 illustrates additional aspects of that portion of the deployment sequence that is described above relative to FIGS. 13 and 14 (i.e., the portion of the sequence wherein stowage pack 24 is tipped outwardly through the door opening 12 by deployment lanyard 134 and arming and actuation unit 136). In particular, as is shown by the solid lines of FIG. 15, prior to initiation of the deployment sequence, sill plate 102 is pivoted about hinge arm 100 so that it extends upwardly along deployment link 32. As the aircraft door 99 begins to open and deployment lanyard 134 causes the evacuation system stowage pack 24 to pass outwardly through the door opening 12, deployment link 32 swings forwardly about hinge plate 86 to, in turn, force sill plate 102 to swing downwardly about hinge arms 100. Thus, as is illustrated in FIG. 16, when deployment lanyard 134 is released from arming and actuation unit 136, slide pack 24 begins to pivot about hinges 80 that are located between deployment panels 30 and 32. In this regard, and as is most clearly illustrated in FIG. 17, sill plate 102 effectively bridges the gap or space between the aircraft door sill 104 and the outboard edge of the system base plate 34 to firmly support deployment link 32 and girt bar 90. Substantially rectangular impact strips 152, which are constructed of a pliant material such as hard rubber and are embedded in recesses in the upper face of sill plate 102, cushion the impact forces that are generated as stowage pack 24 and the surface of deployment link 32 swings downwardly into contact with sill plate 102.

As is indicated in FIGS. 18 and 19, the presently preferred embodiments of the invention include sill latches 154 that project upwardly through the aircraft floor 103 to engage with and secure deployment link 32 during subsequent portions of the evacuation system deployment sequence and during use of the deployed escape slide. As can be seen in FIG. 19, each sill latch 154 is pawl-like in configuration, being pivotable about a bracket 156 that is mounted beneath the aircraft floor 103. A spring 158, connected in tension between the lower end of each latch 154 and a spaced apart, downwardly extending bracket 160, maintains each sill latch in a substantially upright position and causes the latch to engage an outwardly extending lip or flange 162 that extends along the edge of deployment link 32.

With deployment link 32 secured both to base plate 34 and to the sill region of the floor by sill latches 154, stowage pack 24 continues to travel downwardly from the position shown in FIG. 16 by swinging about the hinges 80 until deployment panel 30 extends downwardly alongside the exterior surface of the aircraft fuselage 164. Since the escape slide girt 94 is attached to girt bar 90 within deployment link 32 (FIG. 17), the upper end of the escape slide 18 is pulled from the stowage pack 24 as soon as deployment link 30 comes into position adjacent fuselage 164 and stowage pack 24 continues to travel downwardly by swinging about the hinges formed between deployment links 30 and 28. An impact pad 166 mounted on the lower end of deployment link 30 dissipates the impact forces exerted as deployment link 30 swings into fuselage 164 and protects the exterior of the fuselage against marring or damage. As is indicated in FIG. 20 by the solid and phantom line views, escape slide 10 remains deflated during this portion of the deployment sequence. More specifically, as was described relative to FIG. 5, the disclosed embodiment of the invention is arranged so that inflation of escape slide 10 does not occur until deployment link 28 and packboard 26 swing away from one another about the hinge elements 72 and 74 and cause trigger lanyards 66 to activate valves 60, thereby permitting pressurized gas to flow from gas cylinders 42 and drive the turbine-type air fans 56.

The presently preferred embodiments of the invention are, in fact, arranged so that deployment panel 28 and packboard 26 cannot move away from one another to thereby initiate inflation of the escape slide 10 until stowage pack 24 has reached a predetermined position within the deployment sequence. In particular, as is shown in FIG. 21, when deployment link 28 is in or near the stowed position (i.e., in position to form the upper surface of stowage pack 24), a small rectangular plate 120 that extends upwardly from each side region of packboard 26 is in overlapping juxtaposition with a similar retainer plate 170 that is mounted to extend downwardly from the outer edges of deployment link 28. To provide the desired inflation control while preventing inadvertent inflation of escape slide 10 during system installation and other operation, deployment link 28 is interconnected with packboard 26 by inserting a shear pin (not shown in the drawings) through holes 172 which extend through retainer plates 168 and 170 and come into alignment with one another when deployment link 28 is in the proper stowed position. Selecting a shear pin that exhibits an appropriate fracture characteristic will result in separation of deployment link 28 from packboard 26 (and hence initiation of escape slide inflation) when stowage pack 24 is between the positions indicated in FIG. 20 by phantom and solid lines.

That portion of the deployment sequence wherein retainer plates 168 and 170 are no longer linked together by the shear pin and packboard 26 swings away from deployment link 28 to inflate the escape slide 10 is illustrated most clearly by FIG. 21. As is shown in FIG. 21 and as was mentioned relative to FIG. 5, a spring assembly 70 is preferably employed in conjunction with each trigger lanyard 66 to prevent sharp impulsive tensional forces as deployment panel 28 and packboard 26 begin to swing apart and to maintain a relatively constant tension as packboard 26 continues to fall downwardly and comes to rest against the fuselage 164. In the depicted arrangement, spring assembly 70 includes a tension spring 174 having one end thereof attached to the hinge region between deployment links 30 and 28. The opposite end of spring 174 is attached to the associated lanyard 66, which passes around two small fair leads or pulleys 176 that are mounted within a small recess that is formed in each edge region of deployment panel 128.

Figure 22:
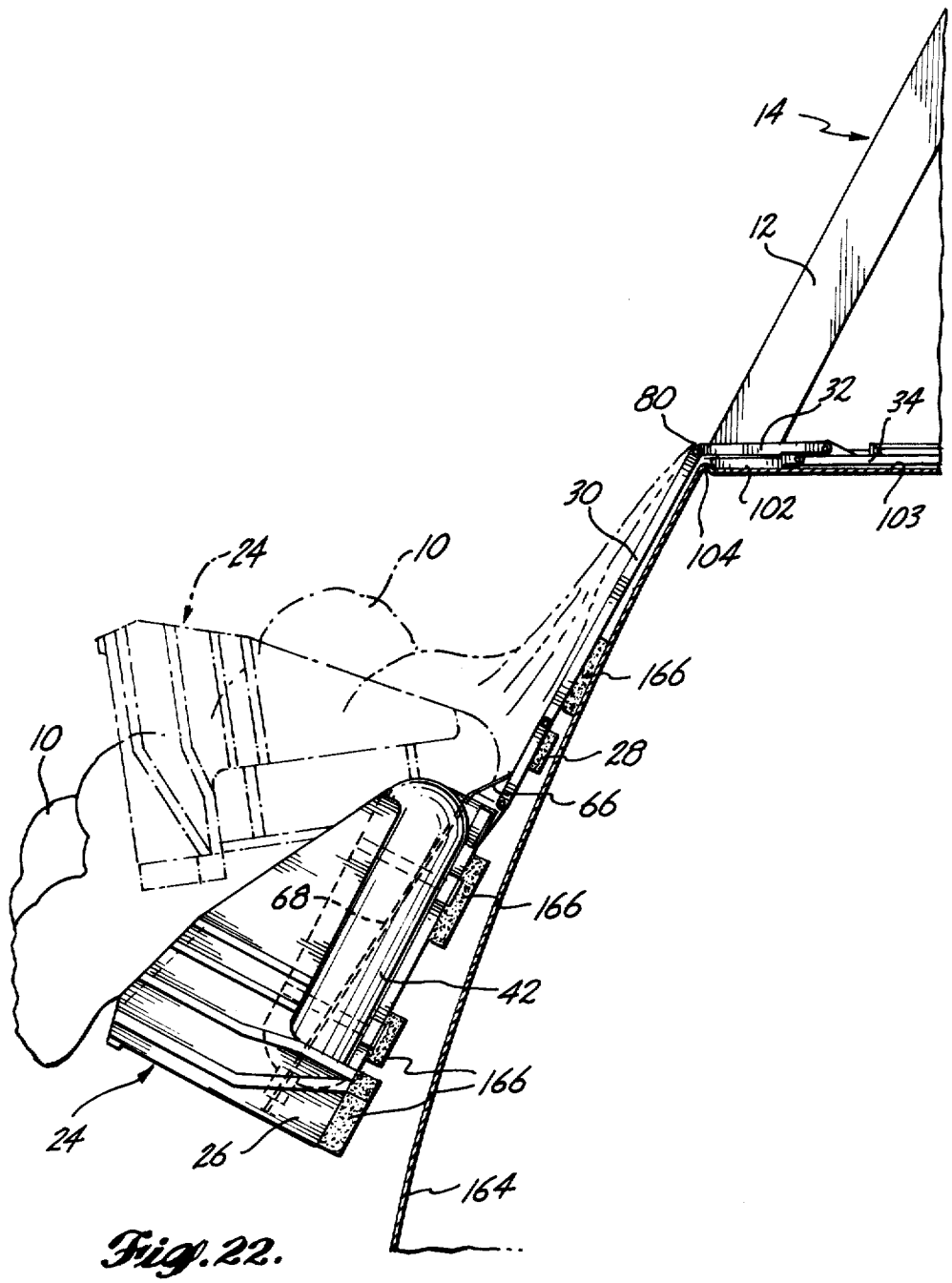
FIG. 22 illustrates the system as the escape slide begins to inflate and the packboard swings into position against the exterior of the fuselage.

Regardless of the exact structure and arrangement utilized to place trigger lanyards 66 under tension and initiate inflation of escape slide 10, slide pack 26 continues to swing downwardly until slide pack 26 and deployment link 28 come to rest against the fuselage 164. Additional impact pads 166 that are mounted on the rear surface of packboard 26 and deployment link 28 absorb the impact force and prevent damage and marring of the exterior surface of fuselage 164. As is diagrammatically indicated in FIG. 22, slide 10 rapidly inflates during this portion of the deployment sequence.

Figure 23:
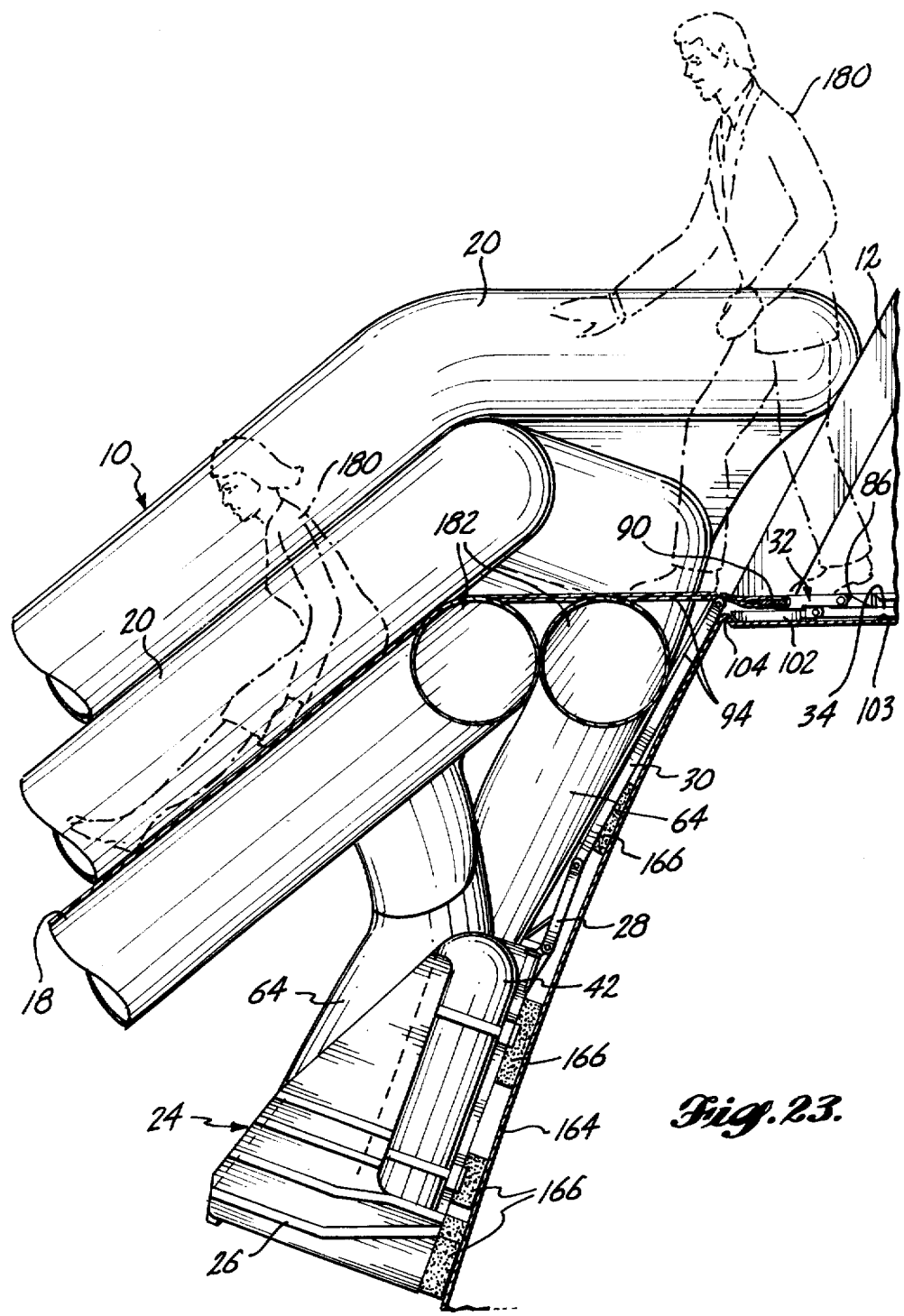
FIG. 23 is a partial elevation view which illustrates the packboard, the deployment links and the upper end of the escape slide when the system is fully deployed and is being utilized to evacuate the aircraft.

FIG. 23 depicts the emergency evacuation system of this system in the fully deployed position. As is indicated in FIG. 23, system base plate 34 and deployment link 32 form a substantially continuous walkway for passengers and crew members 180 that leave the aircraft via door 12 and slide downwardly on the sliding member 18 of escape slide 10. Additionally, as is shown in FIG. 23, the escape slide girt extends from girt bar 90 and encompasses one or more laterally extending cells 182 of escape slide 10 which form an upper platform region. Since girt 94 is dimensioned to be under tension as the escape slide comes into the fully inflated condition, the upper end of escape slide 10 is secured against the aircraft and maintains the escape slide in a usable position in the presence of relatively high winds and other factors. The inflation tubes or manifolds 64 that extend from escape slide 10 to the turbine-type air fans in the lower portion of packboard 26 provide additional stabilization and support.

It should be apparent to those skilled in the art that various alterations and modifications of the above-described embodiments of the invention can be made without departing from the scope and the spirit of the invention. For example, the arming and actuation mechanism 136 described herein was developed primarily for system prototype testing and evaluation and it is contemplated that the adjustment permitting selecting the tension at which the system deployment lanyard is released may be eliminated with respect to production models. Because these and other changes can be easily implemented, it is therefore intended that the scope of protection granted by Letters Patent hereon be limited only by the definition contained in the appended claims and equivalents thereof.

The embodiments of the invention in which an exclusive property or privilege is claimed are defined as follows:

1. An apparatus for stowing an inflatable escape slide on the floor adjacent the sill region of an elevated door and deploying said escape slide through the opening formed when said door is opened, said apparatus comprising:

base means positionable adjacent said door opening and securable to said floor;

deployment means including a plurality of substantially rectangular deployment links and a packboard having at least a bottom panel and a rear panel extending upwardly therefrom, said plurality of deployment links being hinged together to form a set of serially connected deployment links, the upper boundary of said packboard rear panel and the forward boundary of said base means being hinged to the oppositely disposed ends of said set of serially connected deployment links with said packboard being positionable on said base means with said set of serially connected deployment links extending between said upper boundary of said packboard rear panel and said forward boundary of said base means to define a storage space for said escape slide when it is in a deflated condition, said deployment means further including girt bar means, said girt bar means being installed in a manner which allows movement with one of said deployment links and being attachable to the upper end of a deflated escape slide placed in said storage space; and, deployment actuation means for urging the assemblage of said packboard and said deployment links outwardly through said door opening by tipping said assemblage about said hinge between said forward boundary of said base means until said packboard exits said door opening and swings downwardly therefrom and into a position wherein said serially connected set of deployment links and said packboard rear panel extends downwardly from said door opening with said packboard bottom panel extending outwardly therefrom; and, means for initiating inflation of said escape slide when said assemblage of said packboard and said deployment links is at a predetermined position of said downward swinging movement from said door opening to said position in which said deployment links and said packboard rear panel extend downwardly.

2. The apparatus of claim 1 wherein the upwardly extending boundaries of said packboard rear panel are configured and arranged to form compartments for secure stowage of a compressed gas supply; said apparatus for stowing an inflatable escape slide further comprising inflation means interconnectable with said compressed gas supply for rapidly inflating said escape slide as said assemblage of said packboard and said deployment links swings downwardly from said door opening and into said position wherein said deployment links and said packboard extend downwardly.

3. The apparatus of claim 2 further comprising rail means mounted to said floor adjacent said door opening and wherein said base means further includes track means dimensioned and arranged for engagement with said rail means when said base means is moved into position immediately adjacent said door opening engagement of said track means with said rail means securing said base means to said floor and positioning said base means adjacent said door opening, said base means being further configured and arranged for swinging said base means into a position that allows access to said door without deployment of said escape slide while said assemblage of said packboard and said deployment links, an escape slide stored in said storage space and said inflation means that is mounted to said packboard remain in position atop said base means.

4. The apparatus of claim 3 wherein a pivot pin is mounted to extend upwardly from said floor and said base means includes a pivot arm that extends therefrom for engagement with said pivot pin when said base means is moved away from said door to disengage said track means of said base means from said floor-mounted rail means, said base means further including a plurality of roller means for contacting said floor when said track means is disengaged from said rail means, said roller means facilitating said swinging movement of said base member into said position that permits access to said door.

5. The apparatus of claims 1, 2, 3 or 4, wherein said door is hinged to swing outwardly and upwardly and wherein said deployment actuation means includes: an arming and deployment means mounted to the interior of said door said arming and deployment means being connectable to the first end of a deployment lanyard, the second end of said deployment lanyard being connected to the upper portion of said packboard; said arming and deployment means including means for retaining said first end of said deployment lanyard as said door is swung upwardly and said assemblage of said packboard and deployment links swings outwardly through said door opening, said arming and deployment means further including means for releasing said first end of said deployment lanyard when the center of gravity of said assemblage has passed through said door opening.

6. An emergency evacuation system for stowage on the floor adjacent an elevated door and for deployment of an inflatable escape slide from the sill region of said door, said emergency evacuation system comprising:
 a base plate having a forward boundary edge, said base plate being securable to said floor adjacent said sill region of said door;
 a packboard having at least a bottom panel and an upwardly extending rear panel;
 first, second and third substantially rectangular deployment links, said first deployment link including a recess and being dimensioned to extend from said forward boundary edge of said base plate to a position outward of said door sill;
 a first hinge connected between said forward boundary edge of said base plate and a first edge of said first deployment link;
 second and third hinges, said second hinge being connected between a second edge of said first deployment link and a first edge of said second deployment link, said third hinge being connected between a second edge of said second deployment link and a first edge of said third deployment link;
 a fourth hinge connected between a second edge of said third deployment link and the upper boundary edge of said packboard rear panel; and
 an elongated girt bar for encirclement by a girt formed in the upper end of said escape slide, said girt bar being mounted in said recess in said first deployment link, to allow said girt bar to move with said first deployment link as it is extended outward of said door sill.

7. The emergency evacuation system of claim 6 further comprising deployment actuation means for urging the assemblage of said packboard and said first, second and third deployment links outwardly through the opening formed by said door by tipping said assemblage about said first hinge until said first deployment link swings into contact with said door sill region and said second and third deployment links and said packboard swing downwardly about said second, third and fourth hinges.

8. The emergency evacuation system of claim 7 wherein said door is hinged to swing upwardly and outwardly and wherein said deployment actuation means includes:

arming and deployment means affixed to the interior surface of said door for receiving the first end of a deployment lanyard, the second end of said deployment lanyard being connected to the upper portion of said packboard; said arming and deployment means including means for securely retaining said first end of said deployment lanyard as said door swings upwardly to place said deployment lanyard under tension and tip said assemblage of said packboard and said first, second, and third deployment links about said first hinge, said arming and deployment means further including means for releasing said first end of said deployment lanyard when the center of gravity of said assemblage has passed through said door opening.

9. The emergency evacuation system of claim 8 wherein oppositely disposed side regions of said rear panel of said packboard are contoured and arranged to facilitate stowage of compressed gas cylinders for rapid inflation of said escape slide as said assemblage of said packboard and said first, second, and third deployment links swing outwardly through said door opening and into a position wherein said second and third deployment links and said packboard extend downwardly.

10. The emergency evacuation system of claim 9 further comprising means for initiating inflation of said escape slide when said third deployment link and said packboard swing away from one another about said fourth hinge, including:
    at least one valve associatively coupled to each said compressed gas cylinder;
    at least one actuation lanyard operatively connected between each said valve and said third deployment link;
    at least one tubular guide attached to the rear panel of said packboard forming a conduit for each said actuation lanyard between each said valve and said third deployment link;
    each said valve and each said actuation lanyard running through each said tubular guide are so configured and arranged for placing each said actuation lanyard under tension to operate each said valve when said packboard and said third deployment link swing away from one another about said fourth hinge.

11. The emergency evacuation system of claim 10 further comprising at least two rails mounted to said floor adjacent said door and slider plates affixed to the bottom surface of said base plate, said slider plates including channels for engaging with said rails with said slider plates being positioned for receiving said rails to securely link said base plate with said floor when said base plate is moved into the position immediately adjacent said door opening.

12. The emergency evacuation system of claim 11 wherein a pivot pin is mounted to extend upwardly from said floor at a position near said door and said base plate includes a pivot arm that extends outwardly therefrom, said pivot arm including means for engaging said pivot pin when said base plate is moved away from said door to disengage said slider plates from said tracks, said pivot pin and said pivot arm facilitating swinging movement of said base plate into a position that permits access to said door.

13. The emergency evacuation systems of claims 6 or 7 wherein oppositely disposed side regions of said rear panel of said packboard are contoured and arranged to facilitate stowage of compressed gas cylinders for rapid inflation of said escape slide as said assemblage of said packboard and said first, second, and third deployment links swings outwardly through said door opening and into a position wherein said second and third deployment links and said packboard extend downwardly.

14. The emergency evacuation system of claim 13 further comprising means for initiating inflation of said escape slide when said third deployment link and said packboard swing away from one another about said fourth hinge, including:
    at least one valve associatively coupled to each said compressed gas cylinder;
    at least one actuation lanyard operatively connected between each said valve and said third deployment link;
    at least one tubular guide attached to the rear panel of said packboard forming a conduit for each said actuation lanyard between each said valve and said third deployment link;
    each said valve and each said actuation lanyard running through each said tubular guide are so configured and arranged for placing each said actuation lanyard under tension to operate each said valve when said packboard and said third deployment link swing away from one another about said fourth hinge.

15. The emergency evacuation system of claim 14 further comprising at least two rails mounted to said floor adjacent said door and slider plates affixed to the bottom surface of said base plate, said slider plates including channels for engaging with said rails when said base plate is moved into the position immediately adjacent said door opening; with said slider plates being positioned for receiving said rails to securely link said base plate with said floor and position said base plate immediately adjacent said door opening.

16. The emergency evacuation system of claim 15 wherein a pivot pin is mounted to extend upwardly from said floor at a position near said door and said base plate includes a pivot arm that extends outwardly therefrom, said pivot arm including means for engaging said pivot pin when said base plate is moved away from said door to disengage said slider plates from said tracks, said pivot pin and said pivot arm facilitating swinging movement of said base plate into a position that permits access to said door.

* * * * *